United States Patent
Ducka et al.

(10) Patent No.: US 10,954,698 B2
(45) Date of Patent: Mar. 23, 2021

(54) SYSTEM COMPRISING A DOOR, A DOOR LOCK AND A RADIO KEY

(71) Applicant: WITTE Automotive GmbH, Velbert (DE)

(72) Inventors: Radec Ducka, Jirkov (CZ); Derian Marcel, Prague (CZ)

(73) Assignee: WITTE Automotive GmbH, Velbert (DE)

( * ) Notice: Subject to any disclaimer, the term of this patent is extended or adjusted under 35 U.S.C. 154(b) by 184 days.

(21) Appl. No.: 16/031,101

(22) Filed: Jul. 10, 2018

(65) Prior Publication Data

US 2019/0055756 A1  Feb. 21, 2019

(30) Foreign Application Priority Data

Jul. 13, 2017  (DE) .......................... 102017115816.2

(51) Int. Cl.
*E05F 15/20* (2006.01)
*E05B 81/56* (2014.01)
(Continued)

(52) U.S. Cl.
CPC .......... *E05B 81/56* (2013.01); *B60R 25/2081* (2013.01); *E05F 15/77* (2015.01);
(Continued)

(58) Field of Classification Search
CPC . E05B 81/56; G07C 9/00309; G07C 2209/63; G07C 2209/08; G08C 17/02;
(Continued)

(56) References Cited

U.S. PATENT DOCUMENTS 10,256,674 B2 *  4/2019  Dimke .................... H02J 50/60
10,501,052 B2 * 12/2019  Schindler ................ G01S 17/08
(Continued)

FOREIGN PATENT DOCUMENTS

DE       10064141 A1    7/2002
DE       10334624 A1    3/2005
(Continued)

OTHER PUBLICATIONS

European Search Report for European Application No. 18182882.3 dated Nov. 22, 2018; 8 pages.
(Continued)

*Primary Examiner* — Jerry E Redman
(74) *Attorney, Agent, or Firm* — Wiggin and Dana LLP; Gregory S. Rosenblatt; Thomas M. Landman

(57) ABSTRACT

The invention relates to a system comprising a door, in particular of a vehicle, having a door lock, a door control module that has a transmission and reception unit at the door side or is connected thereto, and having a key that is associated with the door lock and that has a transmission and reception unit at the key side, wherein the transmission and reception unit at the door side and the transmission and reception unit at the key side are configured for radio communication. The time of flight of a radio signal transmitted by the transmission and reception unit at the door side and reflected by the transmission and reception unit at the key side can be determined by means of the transmission and reception unit at the door side. Alternatively, the time of flight of a radio signal transmitted by the transmission and reception unit at the key side and reflected by the transmission and reception unit at the door side can be determined by means of the transmission and reception unit at the key side.

17 Claims, 2 Drawing Sheets

(51) Int. Cl.
| | |
|---|---|
| *G07C 9/00* | (2020.01) |
| *E05F 15/77* | (2015.01) |
| *B60R 25/20* | (2013.01) |
| *G01S 13/76* | (2006.01) |
| *G08C 17/02* | (2006.01) |
| B60R 25/24 | (2013.01) |

(52) U.S. Cl.
CPC ........ *G01S 13/767* (2013.01); *G07C 9/00309* (2013.01); *G08C 17/02* (2013.01); *B60R 25/24* (2013.01); *G07C 2009/00555* (2013.01); *G07C 2209/08* (2013.01); *G07C 2209/63* (2013.01); *G08C 2201/91* (2013.01)

(58) Field of Classification Search
CPC .............. G08C 2201/91; G01S 13/767; B60R 25/2081; B60R 25/24; B60R 25/245; E05F 15/77
USPC .......................................................... 49/25
See application file for complete search history.

(56) References Cited

U.S. PATENT DOCUMENTS

| | | | | |
|---|---|---|---|---|
| 2010/0214112 | A1* | 8/2010 | Ishihara | B60R 25/246 340/686.1 |
| 2011/0193721 | A1* | 8/2011 | Koie | B60R 25/00 340/901 |
| 2015/0048927 | A1 | 2/2015 | Simmons | |
| 2016/0144857 | A1* | 5/2016 | Ohshima | G08G 1/056 701/23 |
| 2016/0267734 | A1* | 9/2016 | Hamada | G07C 9/00309 |
| 2016/0304053 | A1* | 10/2016 | Tomita | B60R 25/2081 |
| 2017/0021801 | A1* | 1/2017 | Yamamoto | B60R 25/24 |
| 2017/0342750 | A1* | 11/2017 | Hiramine | G07C 9/00309 |
| 2018/0089919 | A1* | 3/2018 | Ishihara | H04W 12/06 |
| 2018/0106882 | A1* | 4/2018 | Kanaga | G01S 5/0284 |
| 2018/0370487 | A1* | 12/2018 | Ishikawa | H04W 4/44 |
| 2019/0061686 | A1* | 2/2019 | Neuhoff | G07C 9/00309 |
| 2019/0111907 | A1* | 4/2019 | Harata | B60R 16/02 |
| 2019/0256047 | A1* | 8/2019 | Iwashita | B60R 25/24 |
| 2019/0316387 | A1* | 10/2019 | Egawa | E05B 49/00 |
| 2019/0338563 | A1* | 11/2019 | Anzai | E05B 49/00 |
| 2020/0013168 | A1* | 1/2020 | Seshita | G06T 7/11 |
| 2020/0050791 | A1* | 2/2020 | Miller | G07C 9/20 |
| 2020/0070631 | A1* | 3/2020 | Hebling | B60R 25/31 |
| 2020/0072974 | A1* | 3/2020 | Okada | G01S 15/32 |

FOREIGN PATENT DOCUMENTS

| | | |
|---|---|---|
| DE | 102004036920 A1 | 3/2005 |
| DE | 102005042402 A1 | 3/2007 |
| DE | 102014009451 A1 | 12/2015 |
| DE | 102015206009 A1 | 10/2016 |
| DE | 102015213934 A1 | 1/2017 |
| DE | 102015222235 A1 | 5/2017 |
| DE | 102016216053 A1 | 3/2018 |

OTHER PUBLICATIONS

Official Communication from German Patent and Trademark Office for related German Patent Application No. 102017115816.2; dated Dec. 20, 2017; 2 pages.
Time of Flight, Wikipedia <https://en.wikipedia.org/wiki/Time_of_flight>, accessed May 31, 2020.
Ivanecký J., Mehlhase S., An In-Car Speech Recognition System for Disabled Drivers. In: Sojka P., Horák A., Kopeček I., Pala K. (eds) Text, Speech and Dialogue. TSD 2012. Lecture Notes in Computer Science, vol. 7499, pp. 505, 506, Springer, Berlin, Heidelberg (2012) <https://link.springer.com/chapter/10.1007/978-3-642-32790-2_61> accessed May 31, 2020.
Dunn, B., What Is Inifinity Welcome Lighting?, Autobytel.corn <https://www.autobytel.com/car-ownership/technology/what-is-infiniti-welcome-lighting-123420/>, accessed May 31, 2020.
How Car Heating and Ventilation Systems Work, How a Car Works <https://www.howacarworks.com/basics/how-car-heating-and-ventilation-systems-work>, accessed May 31, 2020.
European Patent Office, Communication from the Examining Division, for European patent application No. 18182882, dated Jul. 15, 2020.

* cited by examiner

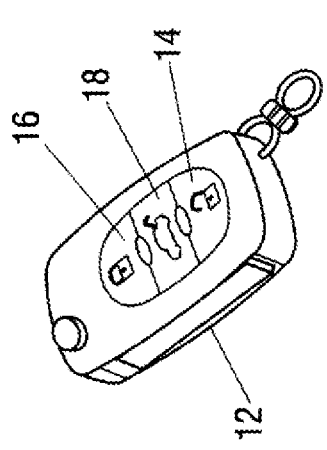
Fig.1
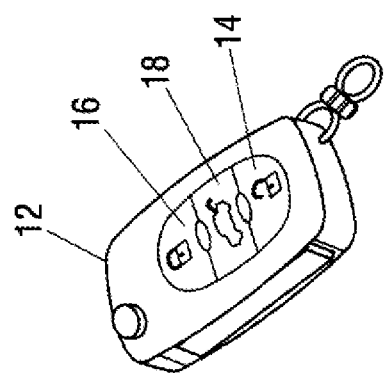
Fig.2
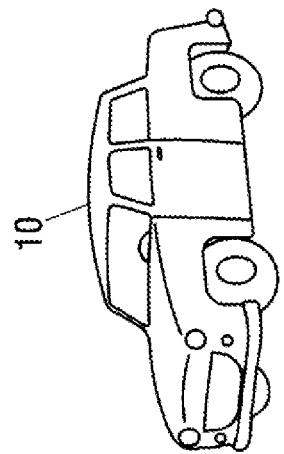
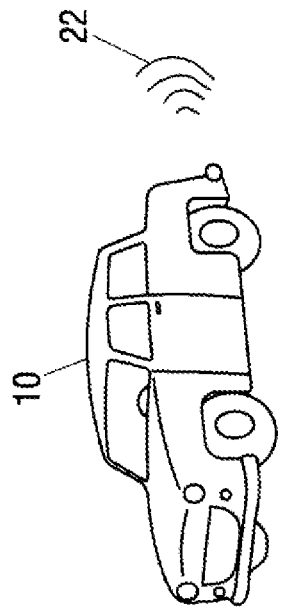

SYSTEM COMPRISING A DOOR, A DOOR LOCK AND A RADIO KEY

CROSS-REFERENCES TO RELATED APPLICATIONS

This application claims the priority of German Application No. 102017115816.2 filed on Jul. 13, 2017, which is incorporated herein by reference, in its entirety.

TECHNICAL FIELD

The invention relates to a system comprising a door, in particular of a vehicle, having a door lock, a door control module that has a transmission and reception unit at the door side or is connected thereto, and having a key that is associated with the door lock and that has a transmission and reception unit at the key side, wherein the transmission and reception unit at the door side and the transmission and reception unit at the key side are configured for radio communication.

BACKGROUND

Systems of the initially named kind are generally known. It is in particular the standard today to equip motor vehicles with radio keys for unlocking and locking door locks from a distance. For protection against theft, the range of the radio connection between the motor vehicle and the radio key is typically limited. However, apparatus have been developed with which the radio signals transmitted by a radio key can be disrupted such that a locking of the door locks is prevented or with which the radio signals transmitted by a radio key can be intercepted and can be transmitted over a distance that considerably exceeds the normal range of the radio connection between the motor vehicle and the radio key. An additional safety measure therefore provides detecting the signal strength of the radio signal transmitted by the radio key and hereby to draw a conclusion on the distance between the radio key and the motor vehicle to only permit an unlocking of the door locks when the radio key is close enough to the motor vehicle. Apparatus have, however, also been developed to overcome this safety measure with which the signal strength of a radio signal intercepted by a radio key can be artificially increased to simulate the proximity of the radio key to the motor vehicle.

BRIEF SUMMARY OF THE INVENTION

It is an object of the invention to provide a system of the initially named kind that is characterized by better theft protection and by higher operating comfort.

The object is satisfied by a system wherein the time of flight of a radio signal transmitted by the transmission and reception unit at a door side and reflected by the transmission and reception unit at a key side can be determined by means of the transmission and reception unit at the door side or in that the time of flight of a radio signal transmitted by the transmission and reception unit at the key side and reflected by the transmission and reception unit at the door side can be determined by means of the transmission and reception unit at the key side.

It is the general underlying idea of the invention to admittedly make the functionality of the key dependent on the distance between the transmission and reception unit at the key side and the transmission and reception unit at the door side, in particular on the distance between the key and the vehicle, but not to measure this distance with reference to the maximum range of the radio connection or to the signal strength of the radio signal received by the transmission and reception unit at the door side, but rather to determine the distance between the transmission and reception unit at the key side and the transmission and reception unit at the door side from the time of flight that a radio signal transmitted by the one transmission and reception unit requires to cover the distance from the other transmission and reception unit and back again. The transmission and reception unit determining the time of flight is provided with or connected to a suitable module for measuring the time of flight for this purpose.

It has been found that it is not possible or is only possible, if at all, with a substantial effort to artificially reduce the time of flight of a radio signal reflected from a far distant transmission and reception unit and intercepted without authorization such that a proximity between the communicating transmission and reception units is simulated that is sufficient to trigger a desired function at the vehicle. An unauthorized triggering of the function, for example an unlocking of the door lock, is therefore practically precluded, whereby the protection against theft is considerably improved.

In this context, a door of a vehicle is not only to be understood as a conventional, pivotable sided door, but also a gull-wing door, a sliding door, a rear door, a tailgate, a trunk lid, or a front hood.

The transmission and reception unit at the key side can furthermore be integrated in the housing of a conventional radio key of a vehicle, i.e. of an automobile key having remote control; but this is not absolutely necessary. A mobile device such as a smart phone can rather also serve as a key in this context and can accordingly be equipped with a transmission and reception unit at the key side.

Advantageous embodiments of the invention can be seen from the dependent claims, from the description and from the drawing.

In accordance with an embodiment, the transmission and reception unit determining the time of flight of a reflected radio signal activates a comfort function when the time of flight of the reflected radio signal falls below a predefined first threshold value; in other words, when the transmission and reception unit at the key side is located below a predefined distance from the transmission and reception unit at the door side or when the time of flight of the reflected radio signal exceeds a predefined second threshold value, i.e. the distance between the transmission and reception units exceeds a predefined value. The operating comfort is considerably increased by the automatic activation of the comfort function.

The activation of the comfort function can, for example, comprise the door being opened automatically. If a user carrying the key with him approaches the vehicle, for example loaded with shopping bags after going shopping, the door opens automatically without the user having to perform an additional action such as pressing a button at the key and/or moving his foot through the detection zone of a sensor.

Alternatively or additionally, the activation of the comfort function can comprise at least one of a vehicle top being automatically opened, a retracted door handle being moved out, a signal generator, for example at least one of an acoustic and a visual signal generator, and in particular at least one light, being switched on for a position determination. The latter makes the orientation and the location of the vehicle easier for the user, for example when it is parked on a large parking lot. The activation of the comfort function can also comprise at least one of the switching on of welcome lighting, a ventilation, a seat heater and an independent vehicle heater.

The comfort function can furthermore comprise the door being closed and locked automatically. This can, for example, be comfortable for a parcel delivery man who takes the key along with him, who alights his vehicle loaded with parcels, and who can rely on the fact that the door opened for the alighting is closed and locked automatically as soon as he has reached a predefined distance from the vehicle. At least one of an automatic closing of a vehicle top, an automatic retraction of an outside door handle and an automatic actuation of a window regulator, for example for closing a window, are also conceivable as comfort functions.

For reasons of simplicity, the first threshold value and the second threshold value can be equal. The activation and deactivation or restoration of the comfort function in this manner each take place at the same distance of the transmission and reception unit at the key side from the transmission and reception unit at the door side. An automatic opening or closing of the door can, for example, be triggered when a user carrying the key with him approaches the vehicle to less than 3 m or moves more than 3 m away from it.

In general, the first threshold value and the second threshold value can, however, also differ. For example, an automatic opening of the door can be triggered when a user carrying the key with him approaches the vehicle to less than 5 m and an automatic closing of the door can be triggered when the user moves more than 2 m away from the vehicle.

It is furthermore conceivable to provide different threshold values for different comfort functions. It is in particular advantageous if a signal generator for position determination, for example a light, is already activated when a user carrying the key with him and approaching the vehicle is still at a distance of e.g. 10-20 m from the vehicle and if a welcome lighting is switched on when the distance between the key and the vehicle is 5-10 m, whereas the door is only automatically unlocked and opened when the distance between the key and the vehicle falls below 3 m. It is understood that the maximum range of the radio connection has to be adapted accordingly and should ideally not fall below 20 m.

In accordance with a further embodiment, the or each threshold value at the door side and/or at the key side can be individually set by a user. This contributes to an even higher operating comfort since the user can configure the system according to his desires and can in particular select the distances of the key from the vehicle at which comfort functions are activated or deactivated or reset. The setting at the door side of each threshold value can here take place via an interface, for example a touchscreen, provided in the vehicle. The key can accordingly also have a suitable interface such as a touchscreen.

For yet a further increase of protection against theft, a comfort function can only be able to be actuated or deactivated or reset during a predefined time window. It is, for example, conceivable only to permit an opening or closing of the door during predefined times of day or night.

Such a time restriction of a comfort function can be implemented, for example, in that its activation or deactivation or resetting is blocked during specific times or in that the transmission and reception unit at the door side only transmits radio signals during a predefined time window.

It also contributes to a yet further increase in the operating comfort if the time window—in a similar manner to the threshold values—can also be set at the door side and/or at the key side individually by a user.

It additionally contributes to a particularly reliable function of the system if the transmission and reception unit determining the time of flight of a reflected radio signal transmits radio signals repeatedly, in particular at regular time intervals, and detects whether the transmitted signals are reflected by a transmission and reception unit at the key side.

The reflecting transmission and reception unit preferably always automatically reflects a radio signal received by the transmission and reception unit determining the time of flight back to the transmission and reception unit determining the time of flight.

In accordance with a further embodiment, the reflecting transmission and reception unit only reflects a radio signal received by the transmission and reception unit determining the time of flight back to the transmission and reception unit determining the time of flight when a user has previously carried out a predefined release action. For example, the user can so-to-say arm the key as the reflecting transmission and reception unit to later use a desired comfort function. The key in this case therefore acts as a function memory in which the activation of the comfort functions is stored to be invoked at a later point in time, namely when the key is at a sufficient proximity to the vehicle. The release action can, for example, be a simple or multiple pressing of a button of the key provided for this purpose or also the carrying out of a suitable setting at a mobile device that carries the transmission and reception unit at the key side.

It also contributes to the improvement of the protection against theft if the radio signal transmitted by the transmission and reception unit determining the time of flight is an encrypted digital signal.

The protection against theft can be even further improved if the reflecting transmission and reception unit modifies a radio signal received by the transmission and reception unit determining the time of flight, in particular provides it with an authentication code, prior to the transmitting back to the transmission and reception unit.

It is also conducive to the protection against theft if the transmission and reception unit at the door side as the transmission and reception unit determining the time of flight initiates an automatic closing of the door and/or locking of the door lock if it does not receive any reflected radio signal.

BRIEF DESCRIPTION OF THE DRAWINGS

The invention will be described in the following purely by way of example with reference to a possible embodiment and to the enclosed drawing.

FIG. 1 shows a vehicle and a radio key that is associated with the vehicle and that is located outside the range of a radio connection between the vehicle and the radio key.

FIG. 2 shows the vehicle and the radio key of FIG. 1, with the radio key being located within the range of the radio connection between the vehicle and the radio key, but still at a large distance from the vehicle.

DETAILED DESCRIPTION

Figure 3:
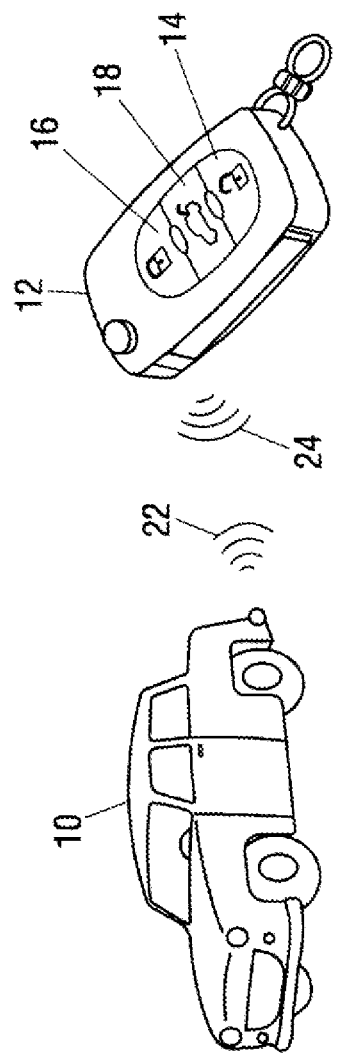
FIG. 3 shows the vehicle and the radio key of FIG. 1, with the radio key being located within the range of the radio connection between the vehicle and the radio key, but at an intermediate distance from the vehicle.
Figure 4:
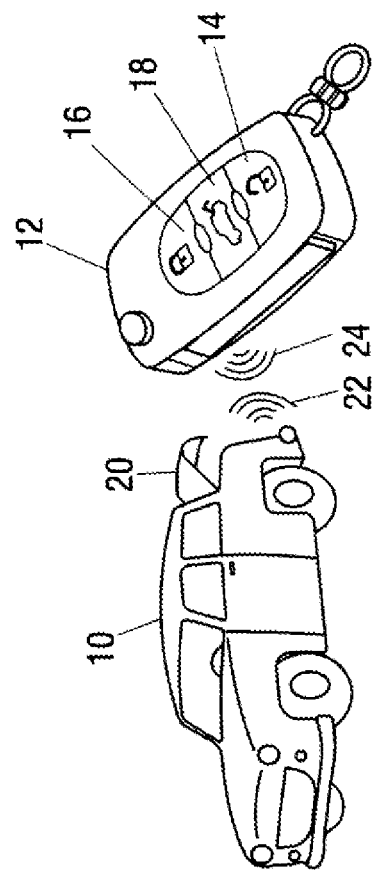
FIG. 4 shows the vehicle and the radio key of FIG. 1, with the radio key being located within the range of the radio connection between the vehicle and the radio key at such a small distance from the vehicle that a tailgate of the vehicle is automatically opened.

A vehicle 10 is shown in the Figures with which a radio key 12 is associated which can communicate in a manner known per se by means of radio with a door control module, here in the form of a central locking, of the vehicle 10. The radio key 12 has a first button 14 on whose actuation the radio key 12 transmits an unlocking signal to the central locking of the vehicle 10 and a second button 16 on whose actuation the radio key 12 transmits a locking signal to the central locking of the vehicle 10.

In addition, the radio key 12 has a third button 18 on whose single actuation the radio key 12 transmits a signal to the central locking that effects an unlocking and opening only of a tailgate 20 of the vehicle 10 provided that the radio key 12 is located within the range of the radio connection between the vehicle 10 and the radio key 12. A multiple actuation, for example a threefold actuation, of the third button 18 in contrast actuates a transmission and reception unit of the radio key 12, i.e. a transmission and reception unit at the key side, and indeed even if the radio key 12 is outside the range of the radio connection.

The vehicle 10 comprises a corresponding transmission and reception unit at the vehicle side, also called a transmission and reception unit at the door side in this context, that is integrated into the central locking in the present embodiment, but can generally also be formed separately therefrom. The transmission and reception unit at the door side is connected either indirectly via the central locking or directly to a drive, for example an electric motor drive, for unlocking and opening the tailgate 20.

The transmission and reception unit at the vehicle side has a plurality of antennas arranged at different points of the vehicle 10 and transmits radio signal 22 via the plurality of antennas into the environment of the vehicle 10 at regular time intervals. These radio signals 22 are encrypted digital signals.

The radio signals 22 transmitted by the transmission and reception unit at the vehicle side are received by the activated transmission and reception unit at the key side as soon as the radio key 12 is within the range of the radio connection between the vehicle 10 and the radio key 12. The received radio signals 22 are provided with an authentication code by the transmission and reception unit at the key side and are sent back to the transmission and reception unit at the vehicle side as reflected radio signals 24. The radio signals 22 transmitted by the transmission and reception unit at the vehicle side are therefore so-to-say reflected back from the radio key 12.

The authentication codes of the reflected radio signals 24 are checked in the transmission and reception unit at the vehicle side. In addition, the times of flight of the reflected radio signals 24 are determined, i.e. the times are therefore measured that elapse from the irradiation of the radio signals 22 up to the reception of the corresponding reflected radio signals 24. The transmission and reception unit at the vehicle side is provided with or is connected to a suitable measurement module for this purpose. Since the radio signals 22, 24 generally propagate at the speed of light, the distance between the transmission and reception unit at the vehicle side and the transmission and reception unit at the key side can be calculated from the time of flight of a radio signal 22, 24, i.e. a conclusion can therefore be drawn on the distance of the radio key 12 from the vehicle 10.

If the radio key 12 approaches the vehicle 10, the times of flight of the reflected radio signals 24 decrease. As soon as the time of flight of a reflected radio signal 24 falls below a predefined first threshold value, i.e. the radio key 12 therefore falls below a predefined distance from the vehicle 10, and as soon as the authentication of the reflected radio signal 24 is positive, the transmission and reception unit at the vehicle side activates the drive of the tailgate 20 to automatically unlock and open it.

If the radio key 12 subsequently again moves away from the vehicle 10, the times of flight of the reflected radio signals 24 increase again. As soon as the time of flight of a reflected radio signal 24 exceeds a predefined second threshold value, i.e. the radio key 12 therefore exceeds a predefined distance from the vehicle 10, the transmission and reception unit at the vehicle side controls the drive of the tailgate 20 such that it is again closed and locked.

The first threshold value and the second threshold value can generally be selected as the same. In practice, it has, however, proven advantageous if the automatic opening of the tailgate 20 is already initiated when a user carrying the radio key 12 with him has already approached the vehicle 10 up to 3 m, for example, whereas the automatic closing of the tailgate 20 can be started when the radio key 12 has reached a distance of 1.5 m from the tailgate 20.

The threshold values at which the automatic opening and closing of the tailgate 20 is triggered can ideally be individually set by a user, for example by means of a touchscreen which is provided in the vehicle 10 and via which the corresponding parameters can be input into the central locking and thus ultimately into the transmission and reception unit at the vehicle side.

REFERENCE NUMERAL LIST 10 vehicle
12 radio key
14 first button
16 second button
18 third button
20 tailgate
22 transmitted radio signal
24 reflected radio signal

What is claimed is:
1. A locking system, comprising
  a door having a lock, a control module and a door-side transmission and reception unit operatively connected to the control module; and
  a key associated with the lock and that has a key-side transmission and reception unit;
  wherein the door-side transmission and reception unit and the key-side transmission and reception unit are configured for radio communication wherein the door-side transmission and reception unit is configured to transmit radio signals at regular time intervals and when the key is within range of radio communication the transmitted radio signals are received at the key side transmission and reception unit, wherein the received signals are provided with an authentication code by the key-side transmission and reception unit, and
  wherein either a time of flight of a radio signal transmitted by the door-side transmission and reception unit and reflected by the key-side transmission and reception unit is determined by the door-side transmission and reception unit; or a time of flight of a radio signal transmitted by the key-side transmission and reception unit and reflected by the door-side transmission and reception unit is determined by the key-side transmission and reception unit.

2. A locking system in accordance with claim 1, wherein the door is a vehicle door.

3. A locking system in accordance with claim 1, wherein the transmission and reception unit determining the time of flight of a reflected radio signal activates a comfort function when the time of flight of the reflected radio signal falls below a predefined first threshold value or when the time of flight of the reflected radio signal exceeds a predefined second threshold value.

4. A locking system in accordance with claim 3, wherein the comfort function comprises at least one function selected from the group consisting of the door automatically opening or automatically closing and locking; a vehicle top automatically opening or closing; a retractable door handle traveling out to a deployed state or traveling in to a retracted state; a signal generator switching on for position determination; at least one of an acoustic and a visual signal generator switching on for position determination; at least one light switching on for position determination; a welcome lighting switching on; a window regulator actuating; a ventilation switching on; a seat heater switching on; and an independent vehicle heater switching on.

5. A locking system in accordance with claim 3, wherein the first threshold value equals the second threshold value.

6. A locking system in accordance with claim 3, wherein different threshold values are provided for different comfort functions.

7. A locking system in accordance with claim 3, wherein at least one of the threshold values is individually set by a user via an interface operatively connected to at least one of the door and the key.

8. A locking system in accordance with claim 3, wherein the comfort function is only actuable during a predefined time window.

9. A locking system in accordance with claim 1, wherein the transmission and reception unit determining the time of flight of a reflected radio signal only transmits radio signals during a predefined time window.

10. A locking system in accordance with claim 9, wherein the transmission time window of at least one of the door-side and key-side transmission and reception unit is individually set by a user.

11. A locking system in accordance with claim 1, wherein the transmission and reception unit determining the time of flight of a reflected radio signal transmits radio signals repeatedly and detects whether the transmitted signals are reflected by the key-side transmission and reception unit.

12. A locking system in accordance with claim 1, wherein the reflecting transmission and reception unit always automatically reflects a radio signal received from the transmission and reception unit determining the time of flight of a reflected radio signal.

13. A locking system in accordance with claim 1, wherein the reflecting transmission and reception unit only reflects a radio signal received from the transmission and reception unit determining the time of flight of a reflected radio signal when a user has previously carried out a predefined release action.

14. A locking system in accordance with claim 1, wherein the radio signal transmitted by the transmission and reception unit determining the time of flight of a reflected radio signal is an encrypted digital signal.

15. A locking system in accordance with claim 1, wherein the reflecting transmission and reception unit modifies a radio signal received from the transmission and reception unit determining the time of flight of a reflected radio signal and transmits the modified radio signal.

16. A locking system in accordance with claim 15, wherein the reflecting transmission and reception unit modifies the radio signal received from the transmission and reception unit determining the time of flight of a reflected radio signal by providing the received radio signal with an authentication code.

17. A locking system in accordance with claim 1, wherein the first door-side transmission and reception unit initiates at least one of an automatic closing of the door and a locking of the door lock if the door-side transmission and reception unit does not receive any reflected radio signal.

* * * * *